United States Patent [19]

Haskin

[11] 4,437,739
[45] Mar. 20, 1984

[54] PORTABLE MAP DISPLAY DEVICE

[75] Inventor: John R. Haskin, Lincoln Park, Mich.

[73] Assignee: Larry L. Ball, Utica, Mich. ; a part interest

[21] Appl. No.: 415,165

[22] Filed: Sep. 7, 1982

[51] Int. Cl.³ .............................................. G03B 23/08
[52] U.S. Cl. ................................... 353/27 R; 353/77; 353/11
[58] Field of Search ...................... 353/11, 12, 77, 78, 353/27 R, 108; 40/361, 362, 366, 367, 502, 506; 101/378

[56] References Cited

U.S. PATENT DOCUMENTS

| 545,306 | 8/1895 | Peter et al. | 40/502 |
| 1,774,595 | 9/1930 | Erwin | 40/502 |
| 3,117,491 | 1/1964 | Stern | 353/27 R X |
| 3,180,259 | 4/1965 | McKay | 101/378 |
| 3,209,645 | 10/1965 | Guttman | 353/12 |
| 3,498,707 | 3/1970 | Allen | 353/77 X |
| 3,762,808 | 10/1973 | Sandmeier | 353/27 R |
| 3,797,925 | 3/1974 | Smitzer | 353/27 R |
| 3,838,916 | 10/1974 | Gawin et al. | 353/27 R |

FOREIGN PATENT DOCUMENTS 867758 2/1953 Fed. Rep. of Germany .... 353/27 R

Primary Examiner—Harry N. Haroian
Attorney, Agent, or Firm—Hauke and Patalidis

[57] ABSTRACT

A portable display device for projecting on a built-in rear projection screen a road map, navigation chart and the like. The road map or navigation chart is in the form of one of a plurality of microfilm frames removably installed in a cut-out portion of a hollow drum in which is disposed a projection lamp. The drum is indexable in angular position and in longitudinal position such as to display an appropriate portion or frame of the microfilm.

3 Claims, 7 Drawing Figures

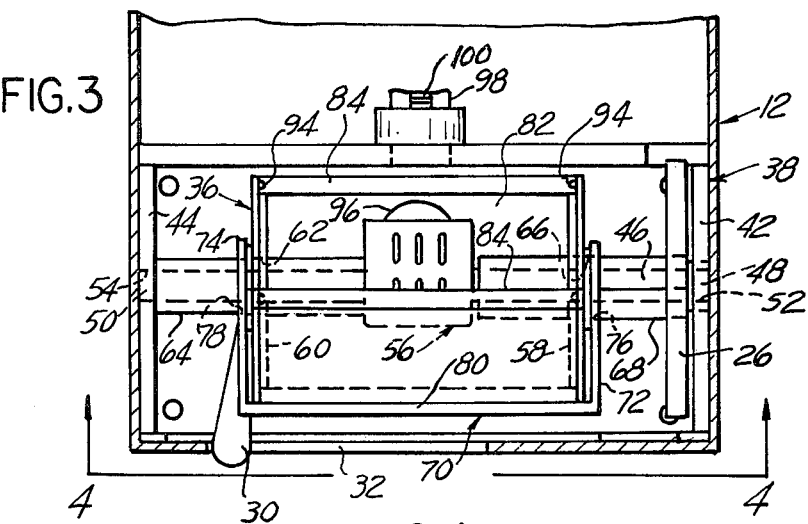
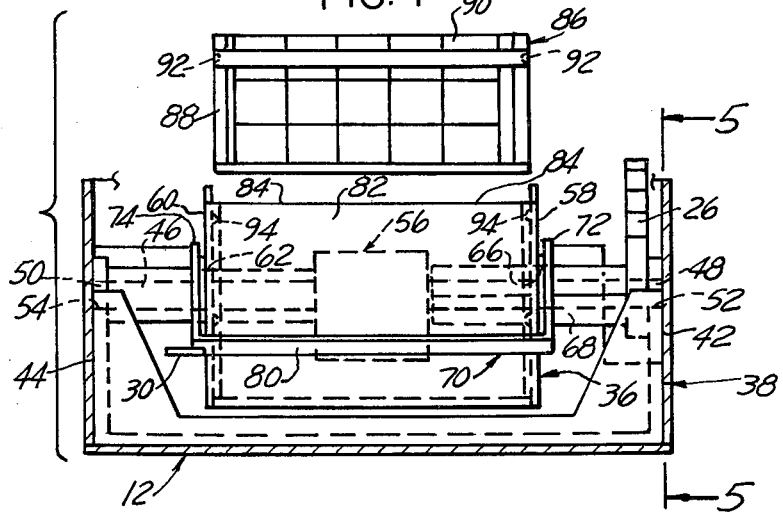
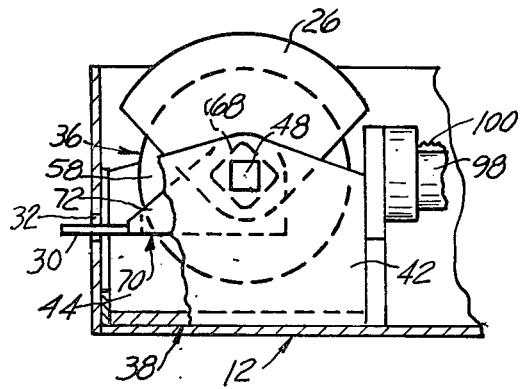
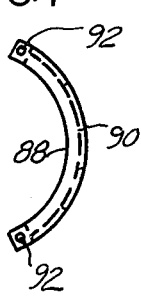
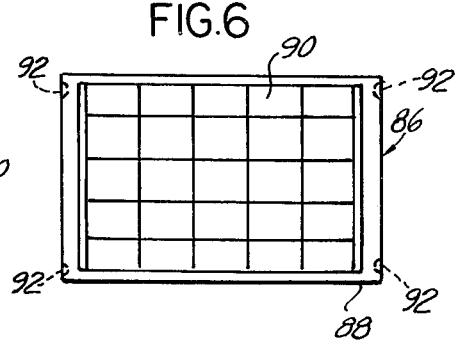

PORTABLE MAP DISPLAY DEVICE

BACKGROUND OF THE INVENTION

The present invention is a portable map display device allowing the user to display on a built-in rear projection screen a frame from a microfilm fiche module representing a road map, a navigation chart, or the like.

In the course of a long cross-country journey, it is not uncommon for a motorist to carry along a plurality of road maps and city maps which he must consult from time to time in order to determine the best available itinerary from one location to another, to compute distances and the time required to travel from one location to another. Conventional road maps, printed on paper, are awkward to handle, difficult to refold along the original folding lines, cumbersome when unfolded, and cities, villages or other sites are difficult to identify even when referring to a directory giving a list of such cities, villages and sites by reference to numerical and alphabetical coordinates. In addition, it is difficult for a motorist on the go to trace an appropriate itinerary on a paper map, and to determine at a glance his location along that itinerary.

Diverse attempts have been made in the past to replace conventional, foldable maps and charts by maps in the form of scrolls which are manually unrolled or which are, preferably, placed in a housing provided with a viewing window. The scroll is attached at each end to a winding and unwinding rod such as to allow unrolling the map flat under the window. However, such an arrangement requires a substantially cumbersome device, and requires fastidious manipulations every time the map must be replaced by another.

The inconveniences and shortcomings of the prior art are overcome by the portable map display device of the present invention which permits to project on a viewing screen a single frame from a microfilm fiche module, the microfilm fiche module providing as much information as would otherwise be provided by a plurality of conventional foldable road maps. Any appropriate individual frame representing a single map, or a portion of map, can be manually indexed such that a predetermined map may be projected on a viewing screen built into the device. As each fiche module is the equivalent of, for example, twenty or thirty, or more, individual maps, a few of such fiche modules are sufficient to cover a considerable territory, by simply replacing the microfilm fiche module in the device of the invention by another.

SUMMARY OF THE INVENTION

The present invention accomplishes its purposes by providing a portable, relatively small-size microfilm projector and display device permitting a road map, a city map, a navigation chart and the like to be displayed on a viewing screen. The microfilm is in the form of a fiche module having a plurality of frames, each representing a specific map or section of a map or chart.

The diverse objects and advantages of the invention will become apparent to those skilled in the art when the following description of the best mode contemplated for practicing the invention is read in conjunction with the accompanying drawing wherein:

BRIEF DESCRIPTION OF THE DRAWING

FIG. 3 is a partial plan view thereof from line 3—3 of FIG. 2 with some elements omitted for the sake of clarity;

FIG. 4 is a partial exploded view thereof from line 4—4 of FIG. 3;

FIG. 5 is a partial elevational view from line 5—5 of FIG. 4; and

FIGS. 6-7 are respectively elevational and end views of a snap-in fiche module.

DETAILED DESCRIPTION OF THE PREFERRED EMBODIMENT

Figure 1:
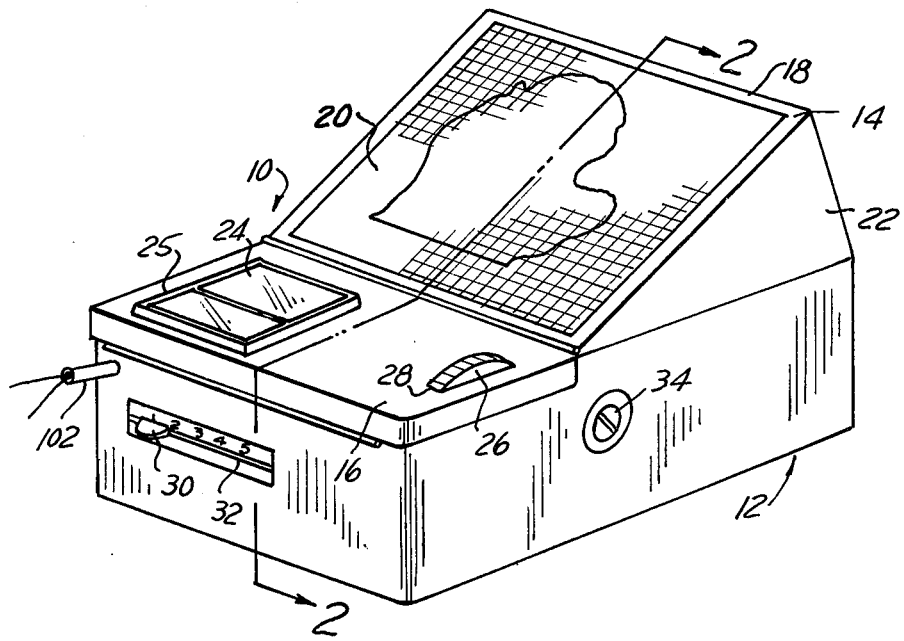
FIG. 1 is a perspective view of a portable map or chart display device according to the present invention.

Referring to the drawing, and more particularly to FIG. 1 thereof, a portable map or chart display device 10 according to the present invention takes the form of a rectangular box-like enclosure or housing 12, made of any convenient material such as sheet metal or plastic, provided with a pop-up hinged lid 14 and a hinged or removable lid 16. The pop-up hinged lid 14 is in the form of a frame 18 surrounding and supporting a rear projection viewing screen 20. The hinged lid 14 has a pair of downwardly extending parallel side walls 22, substantially triangular in shape, provided at their bottom edge with detent abutment means, not shown, determining the angle at which the frame 18 and viewing screen 20 are disposed, when the hinged lid 14 is manually pulled from its storage position coplanar with the lid 16 to its functional position, as shown at FIGS. 1 and 2.

The lid 16 is normally in the position shown at FIG. 1, closing part of the open top of the enclosure 12, except when it is lifted to gain access to the interior of the enclosure 12 for changing map or chart microfilm fiche modules.

The top of the lid 16 may be provided with an index 24 of map or chart fiche modules and with, for example, a mileage and navigation calculator 25. A knob 26 projects edgewise through a slot 28 in the lid 16, and the edge of the knob 26 is provided with indexing markings for location of a portion of a map or chart along one axis, location of the map or chart along axis being obtained by means of a lever 30 projecting through a slot 32 formed in the front wall of the enclosure 12. A focusing knob, or, preferably, a recessed focus-adjusting screw 34 is provided on a side of the enclosure 12 for presetting and readjusting the focus of the projection optics system forming part of the assembly disposed in the enclosure 12.

Figure 2:
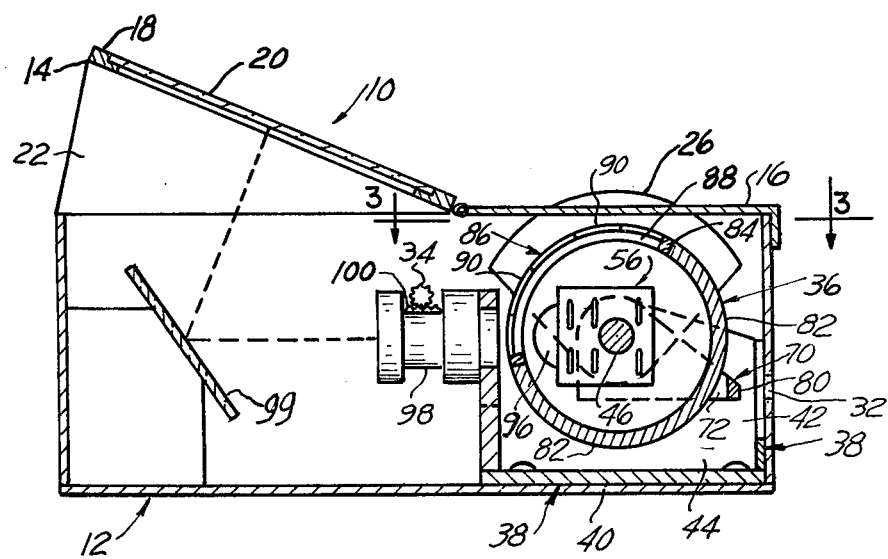
FIG. 2 is a section thereof along line 2—2 of FIG. 1.

Referring to FIGS. 2-4, a hollow rotatable drum 36 is mounted within the enclosure 12 below the lid 16. The rotatable drum 36 is supported by a frame 38 having a base plate 40 attached to the bottom of the enclosure 12 and a pair of parallel end bracket members 42 and 44. A support rod 46 extends between the support bracket members 42 and 44. The support rod 46 has square or hexagonal ends 48 and 50 fitted in corresponding square or hexagonal apertures 52 and 54, respectively, in the support bracket members 42 and 44, such that the support rod 46 is held against rotation. The support rod 46 fixedly supports a lamp housing and reflector assembly 56 disposed inside of the drum 36. The drum 36 has end walls 58 and 60. The end wall 60 is provided with a circular aperture 62 permitting free rotation around a spacer sleeve 64 installed over the support rod 46 between the lamp housing 56 and the support bracket member 44. The other end wall 58 of the drum 36 is provided, for example, with a square aperture 66 through which is passed a sleeve 68, having a square periphery, which is mounted freely rotatable around the support rod 46, the indexing knob 26 which, as shown at FIG. 5, is preferably in the form of a sector, being formed integrally on the end of the sleeve 68 projecting from the drum end wall 58. Therefore, when the indexing knob or sector 26 is manually rotated, the drum 36 is also rotated to a predetermined angular position around its longitudinal axis, in view of the driving coupling between the sleeve 68 and the drum end wall 58.

The drum 36 is laterally displaceable along its longitudinally axis by means of a substantially U-shaped, or forked, drum shifter frame 70 having a pair of parallel shifter brackets 72 and 74 disposed in engagement respectively with the drum end wall 58 and the drum end wall 60. The drum shifter bracket 72 has an aperture 76 through which passes the sleeve 68, the aperture 66 being circular and of a diameter accepting the larger dimension, or diagonal dimension, of the peripherally square sleeve 68. The shifter bracket 74 is provided with a circular aperture 78 accepting the peripherally cylindrical spacer sleeve 64 therethrough. The shifter brackets 72 and 74 are interconnected by a brace member 80, and therefore are displaced in unison by means of the indexing lever 30 projecting through the slot 32 on the front of the enclosure or housing 12, FIG. 1, thus laterally displacing the drum 36 along the axis of the support rod 46 for lateral indexing of the drum.

The drum 36 may be made of any convenient material, such as, for example, plastic, in the form of a single molding having a cylindrical peripheral portion 82 integrally connected to the end walls 58 and 60, the cylindrical portion 82 having a cutout portion 84 in which is snapped a microfilm fiche module 86. The snap-on microfilm fiche module 86 is in the form of a plastic frame 88 supporting a microfilm transparency 90, the frame 88 and consequently the microfilm transparency 90 being curved such as to fit in the cut-out portion 84 of the drum 36. The lateral edges of the frame 88 are provided with recesses 92, FIGS. 4 and 7, that snap over corresponding projections 94 formed on the inside surfaces of the drum end walls 58 and 60. A plurality of microfilm fiche modules 86 are thus capable of storing a considerable amount of map or chart information under a relatively small volume.

The fiche modules 86 are changed by removing the lid 16, FIG. 1, manually pulling the fiche module 86 installed in the cut-out portion 84 by unsnapping the fiche module from the drum, for example by pushing a fingernail between the edge of the frame 88 and the edge of the cylindrical portion 82 of the drum 36 at the cut-out portion 84.

Referring back to FIG. 2, the light from the light housing assembly 56 is condensed on a portion of the microfilm transparency 90 by passage through a condenser optical system 96, and the image from the microfilm is projected upon the rear view transparent screen 20 by a projection lens system 98, after reflection on the surface of mirror 99. Because the portion of the microfilm transparency 90 being projected is curved, the projection lens system 98 includes a cylindrical element for providing a planar image from a non-planar objective frame. Focusing of the projection lens system 98 is effected, for example, by a gear and rack arrangement 100 operated by the focusing knob or screw 34.

An electrical power source for providing electrical current to the projection lamp, not shown, in the lamp housing 56 may take the form of a dry cell or rechargeable battery contained in an appropriate battery holder within the enclosure 12, with a switch, not shown, for turning on or off the projection lamp. Alternatively, electrical current may be supplied to the light bulb by connecting an electrical cable 102, FIG. 1, provided with an appropriate connector, to an electrical outlet in a motor vehicle, such as the cigarette lighter outlet. The wires, not shown, bringing electrical current to the projection lamp are conveniently passed through the interior of the support rod 46.

It will be appreciated by those skilled in the art that after an appropriate microfilm fiche module 86 has been placed in the cut-out portion 84 of the indexable drum 36, the projection lamp is turned on, and an appropriate frame is indexed relative to the projection lens 98 by rotating the drum 36 around its axis of rotation by means of the sector knob 26, and by laterally displacing the drum 36 by means of the lever 30. The appropriate frame is selected as a function of coordinates, listed in a directory or index, for example alphabetical and numerical coordinates, and by rotating the knob 26 and displacing the lever 30 to register with the appropriate coordinates for indexing a particular map represented by a frame 90 of the microfilm fiche module 86.

It will also be appreciated that once an appropriate map has been selected and the image of the selected map is projected on the rear view screen 20, a grease pencil, for example, may be used to draw an itinerary on the upper surface of the viewing screen 20, and that the itinerary may be modified if so desired by wiping out the surface of the projection screen, and a new itinerary set up each time another map portion is indexed and projected on the viewing screen.

It will be further appreciated that although the invention has been described as a road map display device, any other type of information may be displayed on the viewing screen, such as, for example, maritime navigation charts, aeronautical navigation charts and approach plates, checklists and the like.

Having thus described the present invention by way of an example of structure adapted to accomplish the objects of the invention, modifications whereof will be apparent to those skilled in the art, what is claimed as new is as follows:

1. A portable display device comprising a rectangular box-like housing, a hinged lid on said housing in the form of a hinged frame supporting a rearview projection screen, a support rod member fixedly mounted in said housing, a hollow drum mounted rotatable around said support rod member and axially displaceable along said support rod member, said hollow drum having a peripheral cut-out portion with a microfilm fiche module insert removably and interchangeably disposed in said peripheral cut-out portion of the drum, said microfilm fiche module insert having a curvilinear frame supporting a microfilm transparency, said curvilinear frame of said microfilm fiche module insert and said peripheral cutout portion of said hollow drum being provided with interengageable attachment means, illuminating means fixedly mounted on said support rod within said drum for illuminating a portion of said microfilm transparency of said microfilm fiche module insert, lens means mounted in said housing proximate to said drum and optically aligned with said illuminating means for projecting on said rearview screen an image of said illuminated portion of said microfilm transparency, a pivotable sector knob edgewise projecting through a slot in said housing, a sleeve member rotatably disposed around said support rod member, said sleeve member having an end attached to said pivotable sector knob and another end attached to an end of said drum by sliding coupling means, a bifurcated member slidably engaging said drum at each end thereof, a manually actuated lever attached to said bifurcated member and having an end projecting through a second slot in said housing whereby said drum is longitudinally displaceable along its axis of rotation as a result of longitudinal displacement of said manually actuated lever, said drum is rotatable around said support rod member as a result of pivoting said second knob, and co-ordinate reference markings co-operate with said pivotable sector knob and said manually actuated lever for controllably indexing a predetermined portion of said microfilm transparency with said illuminating means and said lens means.

2. The portable display device of claim 1 whererein said microfilm fiche module insert has a plurality of transparency frames, each of said transparency frames being indexable in alignment with said illuminating means and lens means by rotational and longitudinal displacement of said hollow drum by said sector knob and said lever to positions corresponding to a predetermined pair of said co-ordinate reference markings.

3. The portable display device of claim 2 wherein each of said transparency frames is a map.

* * * * *